United States Patent
Damer et al.

(10) Patent No.: US 6,365,061 B1
(45) Date of Patent: Apr. 2, 2002

(54) MULTIBEAM LASER SERVOWRITING OF MAGNETIC DATA STORAGE MEDIA

(75) Inventors: Lewis S. Damer, St. Paul, MN (US); Stephen W. Farnsworth, Loveland, CO (US); Robert S. Jackson, Little Canada, MN (US); Mark P. Lubratt, White Bear Township, MN (US); Robert C. Martin, Stillwater, MN (US); David M. Perry, Lafayette, CO (US); John J. Simbal, Lakeway, TX (US); Daniel P. Stubbs, Marine-On-St.-Croix, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/251,774

(22) Filed: Feb. 17, 1999

(51) Int. Cl.[7] ............................. B44C 1/22; B05D 3/00
(52) U.S. Cl. ........................ 216/65; 216/22; 264/400; 219/121.6; 219/121.68
(58) Field of Search .................... 216/65, 22; 264/400; 427/130; 219/121.6, 121.68

(56) References Cited

U.S. PATENT DOCUMENTS

| | | | |
|---|---|---|---|
| 4,315,283 A | | 2/1982 | Kinjo et al. |
| 4,459,690 A | | 7/1984 | Corsover et al. ......... 369/44.13 |
| 4,597,169 A | * | 7/1986 | Chamberlin .................. 29/605 |
| 4,633,451 A | * | 12/1986 | Ahn et al. ..................... 369/14 |
| 4,961,123 A | * | 10/1990 | Williams et al. ............ 360/131 |
| 5,067,039 A | | 11/1991 | Godwin et al. |
| 5,120,927 A | * | 6/1992 | Williams et al. ....... 219/121.68 |
| 5,279,775 A | | 1/1994 | Thomas et al. |
| 5,283,773 A | | 2/1994 | Thomas et al. |
| 5,499,229 A | | 3/1996 | Murakami et al. |
| 5,619,521 A | | 4/1997 | Tanaka |
| 5,689,384 A | | 11/1997 | Albrecht et al. |
| 5,793,480 A | * | 8/1998 | Lacey et al. ................... 356/73 |
| 5,910,235 A | * | 6/1999 | Gornicki et al. ........ 204/192.32 |
| 5,965,215 A | * | 10/1999 | Xuan .......................... 427/554 |
| 6,084,740 A | * | 7/2000 | Leonhardt et al. ....... 360/78.02 |

FOREIGN PATENT DOCUMENTS

JP       03-003113       1/1991

OTHER PUBLICATIONS

"Timing–Based Track–Following Servo for Linear Tape Systems," Barrett et al., *IEEE Transactions on Magnetics*, vol. 34, No. 4, Jul. 1998, pp. 1872–1877.

* cited by examiner

*Primary Examiner*—Randy Gulakowski
*Assistant Examiner*—Shamim Ahmed
(74) *Attorney, Agent, or Firm*—Eric D. Levinson (57) ABSTRACT

Methods and systems for laser etching of optical servo patterns on magnetic data storage media using two or more beams of laser energy produced from a single source of laser energy to produce a servo pattern on the magnetic data storage media. By using two or more etching beams, the time required to produce a servo pattern on the magnetic data storage media can be significantly reduced. Alternatively, each servo track in the servo pattern can be written more than once. The servo patterns thus formed can be read optically or they may be read magnetically using magnetic overwriting (if the servo pattern is formed in a magnetic coating on the media). In either case, the servo patterns are either permanently formed in the media when read optically, or they can be recreated after bulk erasing if they are provided using magnetic overwriting. In yet another alternative, the servo patterns may be read both magnetically and optically, with the magnetic and optical reading occurring simultaneously or sequentially.

23 Claims, 5 Drawing Sheets

MULTIBEAM LASER SERVOWRITING OF MAGNETIC DATA STORAGE MEDIA

FIELD OF THE INVENTION

The invention relates generally to the etching of servo tracks on magnetic data storage media. More particularly, the present invention relates to etching servo tracks on magnetic data storage media using multiple etching beams of laser energy provided from a source beam.

BACKGROUND

Servo patterns are used to control movement of read/write heads over magnetic data storage media where the media is provided in the form of a circular disk or a tape. The servo patterns on conventional magnetic data storage media, e.g., disks and tapes, are typically provided by magnetically encoding the magnetic coating provided on the substrate of the media.

Magnetic data storage disk systems have been developed that combine magnetic disk recording techniques with high track capacity optical servo patterns and drive systems. In use, an optical servo pattern is pre-recorded on a magnetic floppy disk in the form of a large number of equally spaced concentric tracks about the rotational axis of the disk. Data is stored in the magnetic tracks between the optical servo tracks using conventional magnetic recording techniques. An optical servo mechanism is provided to guide the magnetic read/write head accurately over the data between the optical servo tracks. By utilizing optical servo techniques, much higher track densities are achievable on a relatively inexpensive and typically removable magnetic media. In addition, the servo pattern is not subject to erasure or other degradation from external magnetic fields as are magnetic servo patterns.

The optical servo patterns used on disks may include a large number of equally spaced concentric tracks about the rotational axis of the disk or they may be provided as a continuous spiral track extending from the inside diameter of the disk to the outside diameter of the disk. U.S. Pat. No. 4,961,123 discloses optical servo patterns in which the tracks may be a single continuous groove, a plurality of equally spaced circular pits, or a plurality of short equally spaced grooves or stitches.

A number of techniques for forming the optical servo patterns on the magnetic data storage disks have been developed. U.S. Pat. No. 5,067,039 discloses a method for stamping the servo tracks on the magnetic media using a master stamping disk. U.S. Pat. No. 4,633,451 discloses a method of providing optical servo information on a magnetic medium including a multi-layer film. The optical servo tracks are formed on the multi-layer film by causing a reaction or interdiffusion to occur between layers. The reaction produces a reflectivity contrast between the exposed and unexposed areas. Other methods for manufacturing servo tracks are mentioned, including contact printing, embossing, and lithography.

Another approach to providing laser-etched optical servo tracks on magnetic data storage disks involves contact lithography, i.e., masking the area over which the servo pattern is to be formed, followed by directing laser energy over the masked area. See, e.g., U.S. Pat. Nos. 5,501,944 & 5,633,123. The mask includes openings or transparent areas to allow ablation of the disk surface such that an optical servo pattern is formed on the disk. Disadvantages of this approach include the requirement for a high power laser source and the difficulties in manufacturing the masks.

U.S. Pat. No. 4,961,123 discloses a method and apparatus for etching an optical servo pattern on a disk using a single focused beam of light energy. The magnetic disk is placed on a platen and rotated. A beam of light is focused to a small spot on the spinning data storage disk. The focused beam has sufficient intensity to ablate the disk surface at the spot, thereby reducing the reflectivity of the surface at that spot. As the disk rotates, a groove is produced. The beam can be left on during an entire revolution to produce a continuous groove, or it can be modulated on and off through one revolution to produce a stitched pattern of non-continuous grooves.

In systems and methods in which the optical servo pattern is etched using laser energy, the width of the etched grooves that define each servo track is a function of the energy density delivered by the incident beam to the focused spot relative to the ablation threshold of the media and the focused spot size.

Typically, the groove width in optical servo patterns is on the order of micrometers and must be maintained within tight tolerances. For a single servo track, the energy density at the focused spot and, therefore, the width of the groove (or grooves, with a stitched pattern) can be held constant simply by rotating the disk at a constant angular velocity. As the incident beam is moved radially on the disk surface to etch servo tracks at other radii, the change in radius results in a proportional change in the linear velocity of the disk surface at those radii. Therefore, if the disk rotates at a constant angular velocity, the energy density delivered to the surface of the disk will vary at different radii. To compensate for the varying energy density, it may be desirable to vary the beam intensity based on the linear velocity of the disk at different radii.

One disadvantage of the known systems and methods for laser etching of optical servo patterns is the limitation of producing a single track in an optical servo pattern at one time. As a result, the single beam of laser energy must be traversed over essentially the entire surface of the magnetic data storage disk to produce the entire optical servo pattern. That limitation can reduce throughput in the systems used to manufacture the magnetic data storage disks, thereby increasing the manufacturing costs.

As for the magnetically-encoded servo patterns, the magnetic nature of the patterns may preclude bulk erasing and reformatting by users because such actions could irreversibly destroy the magnetic servo pattern. Furthermore, the equipment required to write magnetic servo patterns on magnetic data storage tapes is costly and can only operate at relatively low speeds, thereby limiting throughput.

SUMMARY OF THE INVENTION

The present invention provides methods and systems for laser etching of optical servo patterns on magnetic data storage media using two or more beams of laser energy produced from a single source of laser energy to produce a servo pattern on the magnetic data storage media. By using two or more etching beams, the time required to produce a servo pattern on the magnetic data storage media can be significantly reduced. Alternatively, each servo track in the servo pattern can be written more than once.

The servo patterns thus formed can be read optically or they may be read magnetically using magnetic overwriting (if the servo pattern is formed in a magnetic coating on the media). In either case, the servo patterns are either permanently formed in the media when read optically, or they can be recreated after bulk erasing if they are provided using magnetic overwriting. In yet another alternative, the servo patterns may be read both magnetically and optically, with the magnetic and optical reading occurring simultaneously or sequentially.

In one aspect, the present invention provides a method of laser etching a servo pattern on magnetic data storage media by providing a source beam of laser energy; separating the source beam of laser energy into two or more etching beams; directing the etching beams onto the magnetic data storage media, whereby at least two servo tracks in the servo pattern are written simultaneously on the magnetic data storage media.

In another aspect, the present invention provides a method of laser etching a servo pattern on a magnetic data storage disk by providing a source beam of laser energy; separating the source beam of laser energy into two or more etching beams; directing the etching beams onto a magnetic coating on the magnetic data storage disk, wherein the etching beams remove at least a portion of the magnetic coating in ablated regions defined by the servo pattern; and rotating the magnetic data storage disk relative to the etching beams, whereby at least two servo tracks in the servo pattern are written simultaneously on the magnetic data storage disk.

In another aspect, the present invention provides a method of laser etching a servo pattern on a magnetic data storage tape by providing a source beam of laser energy; separating the source beam of laser energy into two or more etching beams; directing the etching beams onto a magnetic coating on the magnetic data storage tape, wherein the etching beams remove at least a portion of the magnetic coating in ablated regions defined by the servo pattern; and translating the magnetic data storage tape relative to the etching beams, whereby at least two servo tracks in the servo pattern are written simultaneously on the magnetic data storage tape.

These and other features and advantages of the present invention are described more completely below in connection with the illustrated embodiments presented.

DETAILED DESCRIPTION OF THE ILLUSTRATIVE EMBODIMENTS OF THE INVENTION

The present invention provides methods and systems for producing etched servo patterns on magnetic data storage media. The servo patterns thus formed can be read optically or the servo patterns may be read magnetically using an overwritten magnetic signal (if the servo pattern is formed in a magnetic coating on the media). Alternatively, the servo patterns may be read both optically and magnetically, with the optical and magnetic reading occurring simultaneously or sequentially.

Figure 1:
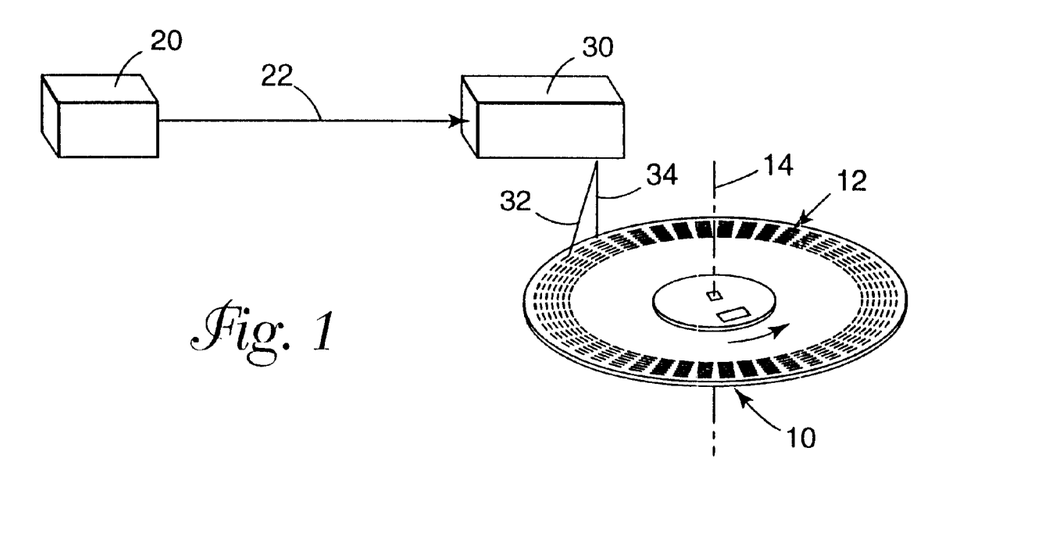
FIG. 1 is a perspective view of one laser servo writing system according to the present invention.

One laser servo writing system is illustrated in FIG. 1 as operating on a magnetic data storage disk 10 to form an optical servo pattern 12 on one surface thereof In the illustrated system, the disk 10 preferably rotates about an axis of rotation 14 to provide concentric tracks as discussed above. The system also includes a source 20 of laser energy and a beam splitting device 30 which preferably splits the source beam 22 produced by the laser source 20 into at least two etching beams 32 and 34 which are directed at the surface of the disk 10 to form the optical servo pattern 12 thereon. By rotating the disk 10 about axis 14, the optical servo pattern 12 can be formed on the surface of the disk 10 by traversing the etching beams 32 and 34 across the surface of the disk 10, preferably in a generally radial direction.

Movement of the etching beams 32 and 34 may depend on the spacing between the focused etching beams 32 and 34. For example, if the focused etch beam spacing is equal to the spacing or pitch of the servo tracks in the servo pattern, then the beam splitting device 30 can be stepped across the surface of the disk 10 in increments equal to the beam spacing times the number of etching beams to produce a plurality of concentric servo tracks on the circular media 10.

Alternatively, however, the spacing between focused etching beams 32 and 34 can be some integer multiple of the servo track pitch. The beam splitting device 30 can then be stepped in increments equal to the servo track pitch until all of the servo tracks between the focused etching beams were formed, after which the beam splitting device 30 would then be stepped a distance equal to the focused etch beam spacing plus one additional servo track pitch spacing to form another set of servo tracks, etc.

The above methods could provide a servo pattern in which the servo tracks were etched once. It may alternatively be desirable to move or step the beam splitting device 30 in smaller increments equal to the servo track pitch such that each servo track pattern is written two or more times. For example, etch beam 32 may form a pattern that is then overwritten by the other etch beam 34. Alternatively, each of the beams 32 and 34 could overwrite their own patterns.

Advantages of writing a servo pattern more than once (or overwriting a servo pattern) can include the formation of servo track features that have a larger aspect ratio (depth:width) than those obtained in servo patterns that are written once. Control over width is important to conserve real estate on the surface of the media 10. The overwritten servo patterns may also offer improved contrast as compared to servo patterns that are written only once.

Methods of accomplishing improved contrast without overwriting would typically require increasing beam power while, at the same time, reducing spot size to account for thermal damage to the materials surrounding the spot.

Smaller spot sizes are, however, undesirable because they cause reductions in depth-of-focus, making it more difficult to keep the spot focused on the media. Although a single beam could be used to overwrite a servo pattern in multiple passes, such a process would likely increase cycle time significantly.

In any overwriting process, the laser energy delivered in the second, third or any successive writing, should be delivered after the thermal energy from the earlier writing has sufficiently dissipated to reduce or prevent increases in the size of the ablated area. If the energy from the earlier servowriting has not sufficiently dissipated before successive servowriting, the ablation threshold could be exceeded over a larger area in the successive writing steps, causing undesirably large increases in the size of the ablated areas on the media. By using multiple beams, however, the overwriting can be accomplished with sufficient time between "writes" to allow the thermal energy from earlier writing to dissipate without significantly slowing the servowriting process.

Figure 2:
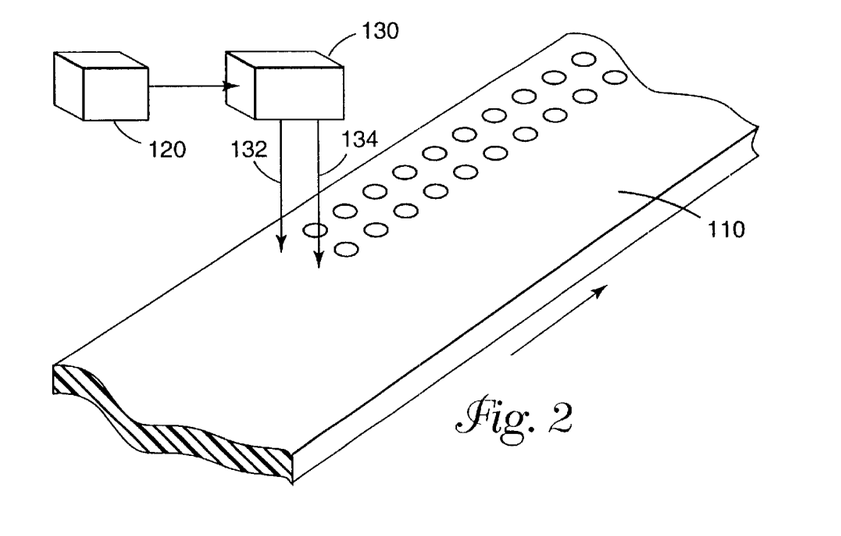
FIG. 2 is a diagram of one laser servowriting system used to form servo patterns on magnetic data storage tape.

FIG. 2 illustrates one system for providing a servo pattern on magnetic data storage media in the form of tape. The system includes a source 120 of laser energy and a beam splitting device 130 that preferably splits the beam of laser energy from the source 120 into at least two etching beams 132 and 134 that are directed onto the tape 110. The tape 110 is preferably moved relative to the etching beams 132 and 134 to produce the desired servo pattern on the tape 110.

Figure 2A:
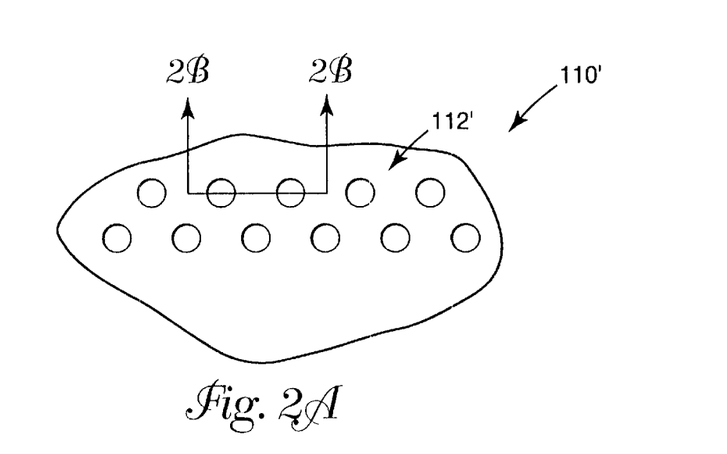
FIG. 2A is an enlarged plan view of a portion of magnetic data storage tape including a servo pattern formed thereon.
Figure 2B:
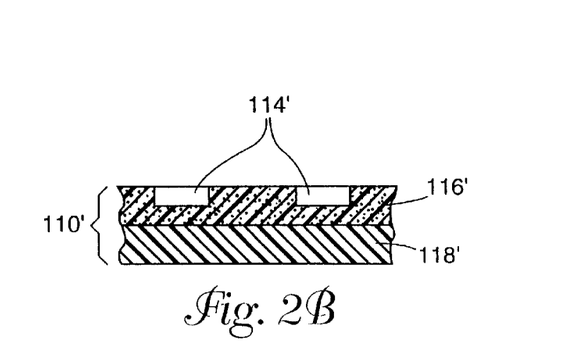
FIG. 2B is an enlarged cross-sectional view of the tape of FIG. 2A, taken along line 2B—2B in FIG. 2A.

FIG. 2A is an enlarged plan view of a data storage media 110' after processing by one of the systems described above. The media 110' includes one servo pattern 112' formed on at least one surface thereof. FIG. 2B is an enlarged cross-sectional view of the media 110' taken along line 2B—2B in FIG. 2A further illustrating the regions 114' of the magnetic coating 116' on the media substrate 118' ablated by the laser energy from the etching beams 132' and 134'. It will be understood that the locations of the magnetic coating and the substrate could be reversed, in which case the servo pattern 112' would be located in the substrate 118'.

The servo pattern 112' illustrated in FIGS. 2A and 2B represents only one example of such a pattern and that other patterns, as well as variations in the size and shape of the ablated regions, could be used in connection with the present invention.

Also, it should be understood that although the magnetic coating and substrate are illustrated as homogenous layers, one or both of the magnetic coating and substrate could be provided as composites of multiple layers of the same or different materials. For example, the substrate may include a base layer of, e.g., polyester, coated with non-magnetic materials on one or both sides. Such a composite is considered to be included within the term "substrate" as used in connection with the present invention. Furthermore, multiple magnetic coatings could be provided on the substrate, with at least some of the magnetic coatings being separated by non-magnetic layers. In addition, the substrate could be provided with magnetic coatings on both of its major sides. Other variations in the exact construction of the media used in connection with the present invention will be known to those skilled in the art of magnetic data storage.

The servo patterns etched into the magnetic data storage media (disk or tape) may be read optically or they may be read magnetically. If the servo patterns are to be read optically, they may be formed on any appropriate surface of the media. For example, the servo patterns may be formed in a magnetic coating on the media, or they may be formed on another surface, e.g., in the substrate. Alternatively, the servo pattern may be formed in another coating provided on the media that is selected for its ability to provide an optical servo pattern with enhanced contrast (e.g., a material that provides high contrast).

If the servo patterns are to be read optically, uniformity in power or intensity between the etching beams may be particularly important to provide the desired contrast required to ensure proper reading of the optical servo pattern. In addition to power uniformity, the focused spot size can also affect the depth and width of the ablated regions. Variations in contrast between tracks on the media can cause off-track positioning errors of the read/write head. The magnitude of the off-track errors will depend, in part, on the design of the optical servo system employed by the data storage drive. If the off-track errors are large enough, correctable soft errors may occur in the electromagnetic data in addition to uncorrectable hard errors which can cause corruption of the recorded data. These problems may be exacerbated by moving media between different drives and/or changing environmental conditions.

To reduce contrast variation and the resulting positioning errors, power uniformity between the beams is desired, for example, it may be desirable that the power variations between maximum intensity and minimum intensity of the etching beams be about 10% or less, more preferably about 5% or less, and even more preferably about 2% or less.

If the servo pattern is to be read magnetically, the servo pattern is formed in a magnetic coating that is magnetically overwritten such that the servo pattern can be magnetically read. Servo patterns formed by etching magnetic coatings are discussed in commonly assigned, copending. U.S. patent application Ser. No. 09/251648 filed on even date herewith, (Attorney Docket No. 53353USA4A). Servo patterns formed by etching magnetic coatings rely on electromagnetic modulation between alternating areas of ablated magnetic coating and unaffected magnetic coating. That electromagnetic modulation could then be used to provide the desired servo information needed to accurately locate the read/write heads during data storage and retrieval.

The etched areas in the magnetic coating may exhibit reduced magnetic moments by removing or destroying at least a portion of the magnetic material in the coating to provide electromagnetic modulation and/or they provide the modulation by varying the separation between the reading magnetic core and the magnetic coating remaining after ablation. Regardless of the cause of the electromagnetic modulation caused by etching, the signal modulation should be significant enough to be accurately detected by a magnetic core on, e.g., a magnetic data storage read/write head. As a result, the exact dimensions of the etched regions can vary based on a number of factors including, but not limited to: the properties of the magnetic coating on the media, the properties of the core on the read/write heads, etc.

Regardless of whether the servo pattern is formed on magnetic data storage media in the form of disks or tape, the present invention provides systems and methods for obtaining multiple etching beams from a source beam and applying those etching beams to the magnetic data storage media to form a servo pattern.

Figure 3:
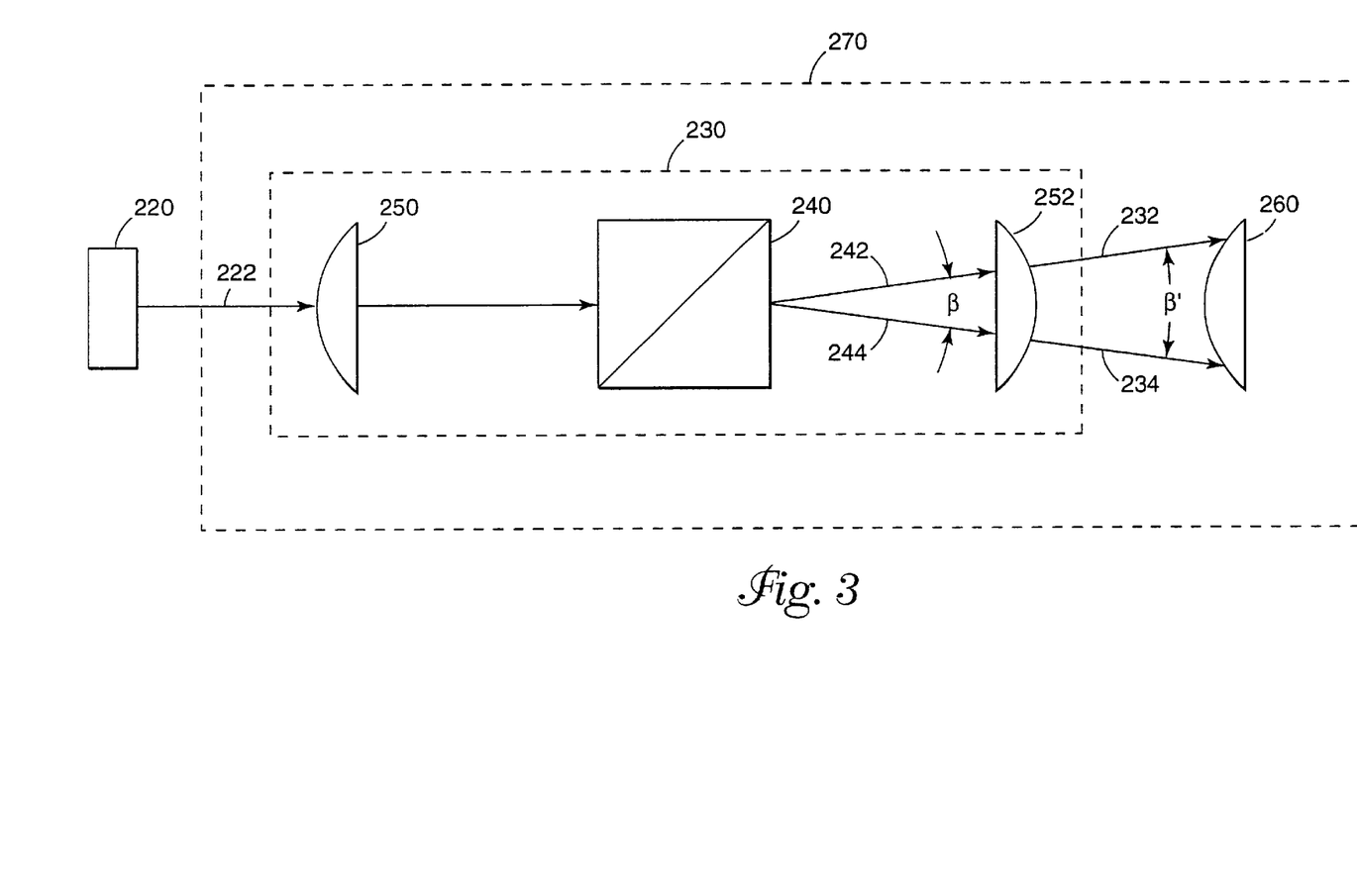
FIG. 3 is a schematic diagram of one beam splitting device for use in laser servo writing systems according to the present invention.

FIG. 3 illustrates one embodiment of a beam splitting device useful in connection with the present invention. The device 230 preferably uses a Wollaston prism 240 to split a source beam 222 into two beams 242 and 244. A Wollaston prism 240 works by using a birefringent material, i.e., a material that exhibits different indices of refraction for light having different polarization orientations.

The device 230 also preferably includes a pair of identical lenses 250 and 252 located on each side of the Wollaston prism 240. The lenses 250 and 252 are spaced apart along a common axis by a distance equal to twice the focal length of one of the lenses. The Wollaston prism 240 is located between the two lenses 250 and 252, preferably closer to forward lens 252 than the rear lens 250.

The Wollaston prism 240 separates the source beam 222 into two output beams 242 and 244 which diverge at an angle β from each other towards the forward lens 252. Those output beams 242 and 244 are then refracted by the forward lens 252 to provide etching beams 232 and 234 that diverge at an angle β'. Moving the Wollaston prism 240 relative to the lenses 250 and 252 can vary the divergence angle β' of the etching beams 232 and 234. That variation in divergence angle can then be relied on to change the distance between the focused spots formed after the etching beams pass 232 and 234 through a focus lens 260.

It is generally preferred that the Wollaston prism 240 be located closer to the forward lens 252 than the rearward lens 250. If the Wollaston prism 240 is closer to the forward lens 252, then further movement of the Wollaston prism 240 towards the forward lens 252 will generally cause the divergence angle β' between the etching beams 232 and 234 to increase up to a maximum of β. Conversely, movement of the Wollaston prism 240 towards the rearward lens 250 (but still ahead of the midpoint between the lenses 250 and 252) will generally cause the divergence angle β' between the etching beams 232 and 234 to decrease towards zero when the prism 240 is located at the midpoint between the lenses 250 and 252.

As discussed above, changing the divergence angle β' between the etching beams 232 and 234 changes the distance between the focused spots formed by each beam after focusing by lens 260. Because the change in position of the prism 240 relative to the lenses 250 and 252 can be finely controlled, corresponding fine control can be exercised over the divergence angle β' and, therefore, the spacing between focused spots on the media.

With the divergence angle between the etching beams 232 and 234 set, they can be focused on and traversed across the surface of a spinning magnetic data storage disk to provide a desired optical servo pattern or they can be directed onto the surface of a magnetic data storage tape to form a magnetic servo pattern in conjunction with magnetic overwriting.

It may be further preferred that the distance between the beam splitting device 230 (including lenses 250 and 252 and Wollaston prism 240) and the focus lens 260 be held constant while the distance between the laser source 220 be varied during movement of the etching beams 232 and 234 across the surface of the media (not shown). For example, the beam splitting device 230 could be mounted on a unitary moving sled 270 along with the focus lens 260 to provide the desired fixed spatial relationships. The sled 270 could then be moved relative to the laser source 220 as desired.

Figure 4:
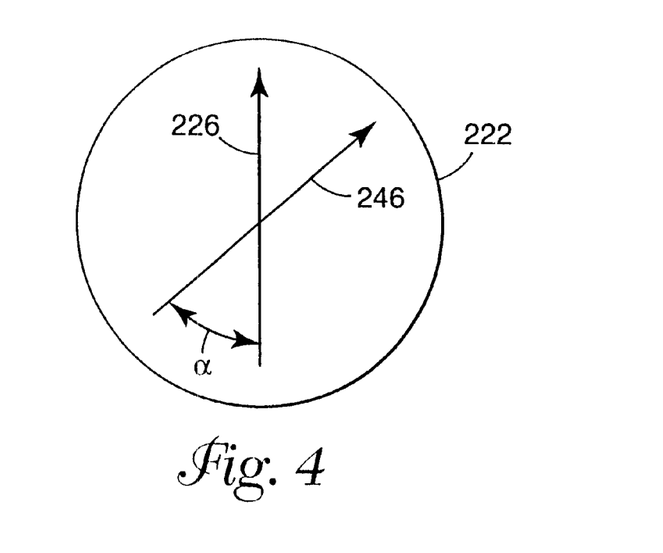
FIG. 4 is a diagram illustrating the respective polarization axes of a source beam and a Wollaston prism.

FIG. 4 is a diagram illustrating operation of the Wollaston prism in connection with a source beam of laser energy 222 which preferably exhibits a linear polarization orientation 226 as seen in FIG. 4. The Wollaston prism itself exhibits an optical axis 246 which is preferably offset from the polarization orientation of the incoming light in source beam 222. The offset angle α between the polarization orientation 226 of the source beam 222 and the optical axis 246 of the Wollaston prism can vary, although one preferred orientation would have angle α at 45 degrees to provide even power distribution between the etching beams 232 and 234. It may, however, be desirable to provide uneven power distribution between the etching beams 232 and 234 (see FIG. 3) and in those situations angle α may not be equal to 45 degrees. The angle α between the polarization axis 226 and the optical axis 246 will preferably be greater than zero degrees and less than 90 degrees to effect some separation or division of the power in the source beam 222 to produce the output beams 242 and 244.

Although the beam splitting device 230 utilizes only a single Wollaston prism 240, it will be understood that multiple Wollaston prisms 240 could be used to provide more than two etching beams 232 and 234 which, in some instances, may be desirable to further increase the speed of the laser servo writing process.

Figure 5:
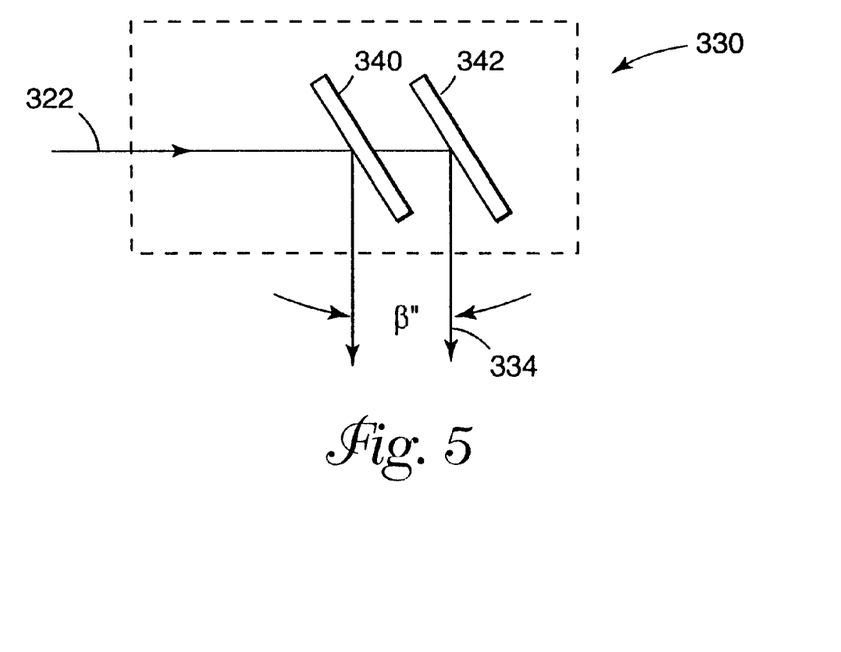
FIG. 5 is a schematic diagram of an alternate beam splitting device for use in a laser servo writing system according to the present invention.

FIG. 5 illustrates another alternate beam splitting device for use in the systems and methods according to the present invention. The device 330 includes a pair of mirrors 340 and 342. The first mirror 340 is preferably a partially reflective, partially transmissive beam splitting mirror which reflects a portion of the source beam 322 of laser energy incident thereon to form an etching beam 332 and transmits a portion of the beam to the second mirror 342 which then reflects that portion of the beam to form a second etching beam 334. The beam splitting mirror 340 is preferably capable of accurately transmitting a desired percentage of the laser energy and reflecting a desired percentage of the incident laser energy from source beam 322. It may typically be preferred that the beam splitting mirror 340 reflect substantially 50% of the incident energy and transmit substantially 50% of the incident energy. It may also typically be preferred that the second mirror 342 reflect substantially all of the laser energy incident thereon to form the second etching beam 334.

The divergence angle β" between etching beams 332 and 334 can be controlled by the mirrors 340 and 342. Changes in the angle β" cause changes in the distance between the focused spots formed after the etching beams 332 and 334 pass through the focusing lens 360. Furthermore, even power distribution between the two etching beams 332 and 334 also requires that the beam splitting mirror 340 be consistently accurate in the portions of light which it transmits and reflects.

Although not depicted, it will be understood that more than one beam splitting mirror could be used in a device similar to 330 to provide more than two etching beams 332 and 334 from a single source beam 322. In such a system, the percentage of energy transmitted versus the percentage of energy reflected from each of the beam splitting mirrors should be carefully controlled to provide etching beams with the desired relative amounts of energy.

Figure 6:
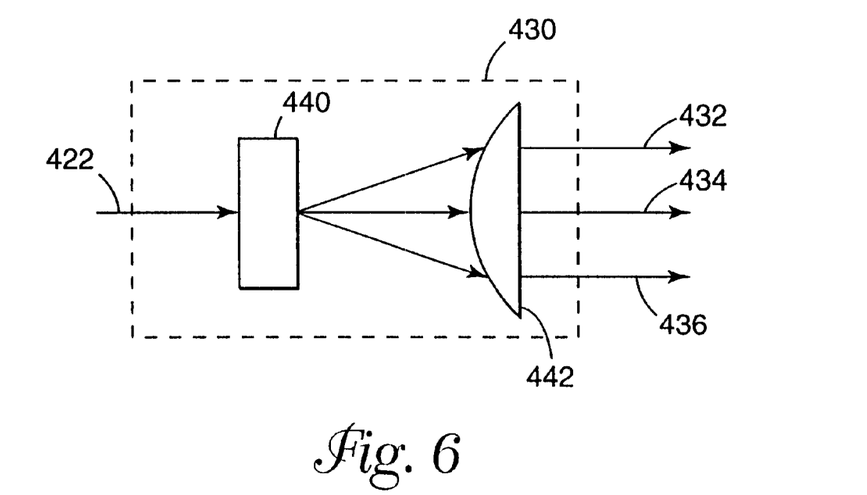
FIG. 6 is a schematic diagram of another alternate beam splitting device relying on a diffractive optical element for use in a laser servo writing system according to the present invention.

FIG. 6 illustrates another beam splitting device 430 for splitting a source beam 422 into two or more etching beams. The device 430 preferably employs a diffractive optical element 440, e.g., a diffraction grating or some other diffractive element, and a lens 442 that combine to split the source beam 422 into a plurality of etching beams 432, 434 and 436.

Although a diffractive optical element 440 can be designed to produce almost any number of beams, some multiples are preferred because of the tolerances required to manufacture the diffractive optical element 440 and the power uniformities that can be practically achieved between the etching beams. In addition, other factors affecting the number of beams produced include the amount of power available from the source beam, the efficiency of the diffractive optical element and the power required for each of the etching beams to cause ablation of the media.

Where the diffractive optical element 440 is a diffraction grating and the servo pattern is to be read optically using contrast, it may be preferred that the primary diffraction orders (i.e., the zero and first orders which produce the etching beams) exhibit the desired power uniformities discussed above. It may further be preferred that the power of any individual extraneous order (e.g., second, third, etc.) beams produced have less than about 15% of the power of the etching beams produced by the primary order diffraction. Limiting the power in the non-primary order beams can reduce the problem of undesired ablation or other damage adjacent to the regions etched by the primary order etching beams.

The spacing between the etching beams 432, 434 and 436 may preferably be matched to the desired pitch requirements of the desired servo track pattern. The resultant spacing between etching beams 432, 434 and 436 is dependent on the wavelength of the source beam 422, the optical properties of the diffractive optical element 440 and the optical properties of the focusing lens 442. Where the diffractive optical element 440 is a diffraction grating, the grating period can also affect the spacing between the etching beams 432, 434 and 436. With a diffraction grating, the etching beam spacing is typically controlled by the grating period because the wavelength of the source beam 422 and the focal length of the lens 442 are fixed due to other design considerations. For servo systems such as those used in the production of 120MB SUPERDISK™ diskettes, it is desirable to control the servo track pitch to about ±0.3 micrometers or less, more preferably about ±0.1 micrometers or less. Where the etching beam spacing is equal to the servo track pitch, the diffraction grating and lens preferably provide primary order diffraction beams that meet these requirements.

As one example, if the source beam 422 operates with a wavelength of 532 nanometers (such as that produced by a Diode Pumped Solid State (DPSS) laser) and the lens 442 has a focal length of 14.5 millimeters, the desired diffraction grating period required to produce an etching beam spacing of 20.4 micrometers (which is equal to the current servo track pitch used on 120MB SUPERDISK™ diskettes) is about 378 micrometers. Diffraction gratings can be obtained from a number of optical equipment suppliers, e.g., Digital Optics Corp., Charlotte, N.C. Donnelly Optics, Tucson, Ariz.; Rochester Photonics Corp., Rochester, N.Y.; and Teledyne Brown Engineering, Huntsville, Ala.

Figure 7:
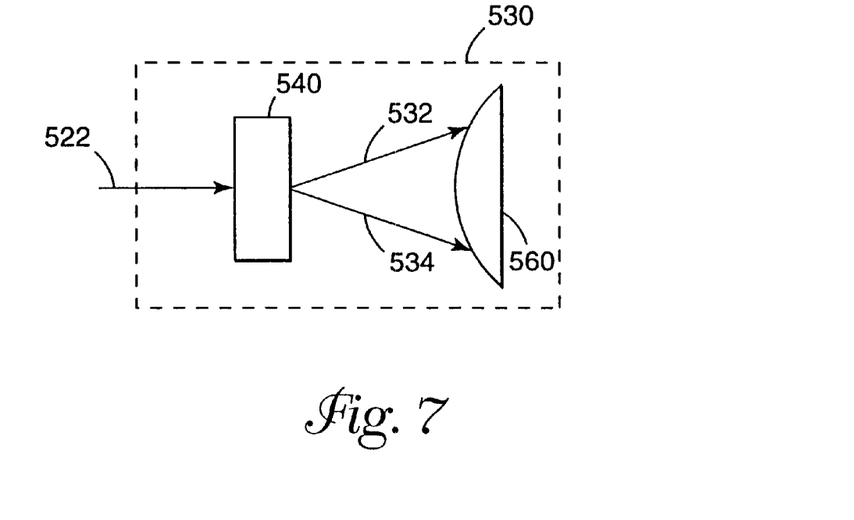
FIG. 7 is a schematic diagram of another alternate beam splitting device relying on a holographic optical element for use in a laser servo writing system according to the present invention.

FIG. 7 illustrates another beam splitting device 530 for splitting a source beam 522 into two or more etching beams. The device 530 preferably employs a holographic optical element 540 and a lens 560 that combine to split the source beam 522 into a plurality of etching beams 532 and 534.

Figure 8:
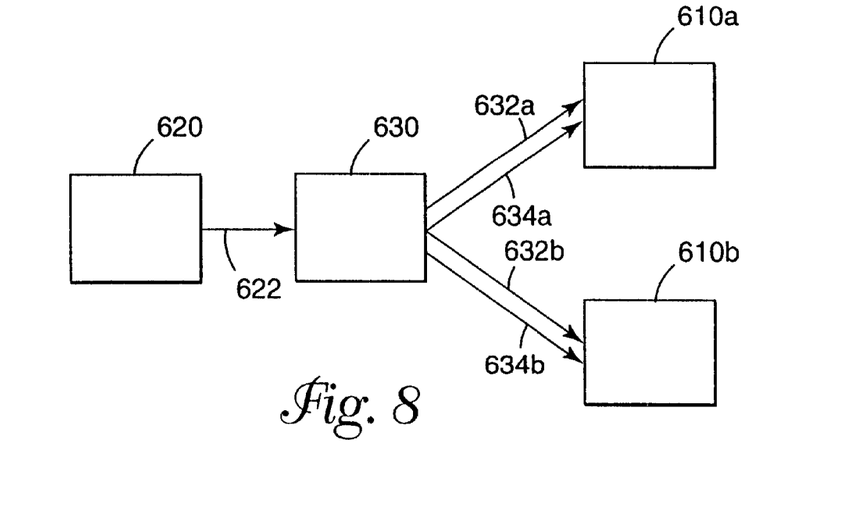
FIG. 8 is a diagram of another system and method according to the present invention in which a source beam is used to etch servo patterns on two different magnetic data storage media simultaneously.

FIG. 8 schematically illustrates another system and method according to the present invention in which a single source 620 of laser energy produces a source beam 622. The source beam 622 is directed into a beam splitting device 630 to produce etching beams 632a, 634a directed at magnetic data storage media 610a. The beam splitting device 630 also provides etching beams 632b, 634b directed at another magnetic data storage media 610b. As a result, FIG. 8 illustrates both a system and method of simultaneously forming servo patterns on two different articles of magnetic data storage media 610a, 610b.

Although a limited number of illustrative embodiments are described above, various modifications and alterations of this invention will become apparent to those skilled in the art without departing from the scope of this invention, and it should be understood that this invention is not to be unduly limited to the illustrative embodiments and methods set forth herein.

What is claimed is:

1. A method of laser etching a servo pattern on magnetic data storage media comprising:
   providing a source beam of laser energy;
   separating the source beam of laser energy into two or more etching beams;
   directing the etching beams onto a magnetic coating on the magnetic data storage media,
   wherein the etching beams remove at least a portion of the magnetic coating to form ablated regions in the servo pattern;
   whereby at least two servo tracks in the servo pattern are written simultaneously on the magnetic data storage media.

2. A method according to claim 1, wherein the magnetic data storage media comprises a disk, and further wherein the method comprises rotating the disk relative to the etching beams.

3. A method according to claim 1, wherein the magnetic data storage media comprises tape, and further wherein the method comprises moving the tape relative.

4. A method according to claim 1, wherein the etching beams remove only a portion of the magnetic coating in the ablated regions.

5. A method according to claim 1, wherein the etching beams remove at least a portion of the substrate in the ablated regions defined by the servo pattern.

6. A method according to claim 1, wherein separating the source beam comprises directing the source beam into a beam splitting mirror block.

7. A method according to claim 1, wherein separating the source beam comprises directing the source beam-into a diffractive optical element.

8. A method according to claim 7, wherein the diffractive optical element comprises a diffraction grating.

9. A method according to claim 7, wherein separating the source beam comprises directing the source beam into a holographic optical element.

10. A method according to claim 1, wherein the source beam is linearly polarized with a polarization vector, and further wherein separating the source beam comprises directing the source beam into a Wollaston prism with an optical axis that is offset from the polarization vector of the source beam.

11. A method according to claim 10, wherein the optical axis of the Wollaston prism is offset from the polarization vector of the source beam by about 45 degrees.

12. A method according to claim 10, wherein the Wollaston prism is located between first and second lenses, and further wherein changing the distances between the Wollaston prism and the first and second lenses changes a divergence angle between the etching beams.

13. A method according to claim 1, wherein power variations between the two or more etching beams are about 10% or less.

14. A method according to claim 1, wherein the two or more etching beams diverge at a divergence angle, and wherein the method further comprises adjusting the divergence angle to obtain a desired servo track pitch.

15. A method according to claim 1, wherein each servo track in the servo pattern is written more than once.

16. A method of laser etching a servo pattern on a magnetic data storage disk comprising:
   providing a source beam of laser energy;

separating the source beam of laser energy into two or more etching beams;

directing the etching beams onto a magnetic coating on the magnetic data storage disk, wherein the etching beams remove at least a portion of the magnetic coating in ablated regions defined by the servo pattern; and rotating the magnetic data storage disk relative to the etching beams, whereby at least two servo tracks in the servo pattern are written simultaneously on the magnetic data storage disk.

17. A method according to claim 16, wherein the source beam is linearly polarized with a polarization vector, and further wherein separating the source beam comprises directing the source beam into a Wollaston prism with an optical axis that is offset from the polarization vector of the source beam.

18. A method according to claim 17, wherein the Wollaston prism is located between first and second lenses, and further wherein changing the distances between the Wollaston prism and the first and second lenses changes a divergence angle between the etching beams.

19. A method according to claim 16, wherein separating the source beam comprises directing the source beam into a diffractive optical element.

20. A method according to claim 19, wherein the diffractive optical element comprises a diffraction grating.

21. A method according to claim 16, wherein each servo track in the servo pattern is written more than once.

22. A method of laser etching a servo pattern on a magnetic data storage tape comprising:

providing a source beam of laser energy;

separating the source beam of laser energy into two or more etching beams;

directing the etching beams onto a magnetic coating on the magnetic data storage tape, wherein the etching beams remove at least a portion of the magnetic coating in ablated regions defined by the servo pattern; and translating the magnetic data storage tape relative to the etching beams, whereby at least two servo tracks in the servo pattern are written simultaneously on the magnetic data storage tape.

23. A method according to claim 22, wherein each servo track in the servo pattern is written more than once.

* * * * *